United States Patent [19]

Masuda et al.

[11] Patent Number: 5,367,852

[45] Date of Patent: Nov. 29, 1994

[54] SUPPORT SYSTEM

[76] Inventors: Akira Masuda, 815 Shinmatsudo Haitsu, 743 Ooyaguchi, Matsudo-shi, Chiba; Kikuzo Kuramoto, 3-1-31-1305, Yazu, Narshino-shi, Chiba, both of Japan

[21] Appl. No.: 995,027

[22] Filed: Dec. 22, 1992

[30] Foreign Application Priority Data

Dec. 27, 1991 [JP] Japan .................................. 3-358923

[51] Int. Cl.⁵ ............................ E04G 1/00; F16B 7/00
[52] U.S. Cl. ............................. 52/651.06; 403/174; 403/178; 403/217; 403/246; 182/179; 52/655.1; 52/646; 52/651.1; 52/653.2
[58] Field of Search ................. 52/655.1, 653.2, 651.1, 52/651.06, 651.05, 651.01, 646, 645, 126.6; 182/179, 178; 403/49, 246, 245, 170, 174, 178, 217

[56] References Cited

U.S. PATENT DOCUMENTS

| | | | |
|---|---|---|---|
| 3,190,405 | 6/1965 | Squire | 52/651.1 X |
| 3,650,078 | 3/1972 | Jennings | 52/646 X |
| 3,807,120 | 4/1974 | Viandon | 52/646 X |
| 4,004,393 | 1/1977 | Morris | 52/651.1 X |
| 4,083,640 | 4/1978 | Lovering | 182/179 X |
| 4,493,578 | 1/1985 | D'Alessio | 403/49 |
| 4,514,940 | 5/1985 | Manderla | 52/646 X |
| 4,587,786 | 5/1986 | Woods | 52/638 |
| 4,841,708 | 6/1989 | Johnston | 52/646 |
| 5,024,037 | 6/1991 | Ono | 52/646 |
| 5,207,527 | 5/1993 | Duncan et al. | 182/179 X |
| 5,217,314 | 6/1993 | Perruelle | 403/49 |

FOREIGN PATENT DOCUMENTS 3-22418  6/1987  Japan .............................. E04G 1/12

*Primary Examiner*—Carl D. Friedman
*Assistant Examiner*—Robert J. Canfield
*Attorney, Agent, or Firm*—McGlew & Tuttle

[57] ABSTRACT

A support system suitably applicable as a timbering for construction of a concrete structure, which can reduce the number of parts and greatly improve the workability. The support system includes a plurality of jack members 6 placed on the ground or the like, a plurality of bottom members 5 connected to upper ends of the jack members 6, a plurality of vertical members 1 connected to upper ends of the bottom members 5, the vertical members 1 being connected with each other at upper and lower ends thereof, a plurality of vertically inverted jack members 6 connected to the upper ends of uppermost ones of the vertical members 1, a plurality of horizontal members 2 horizontally extending between the vertical members 1, and a plurality of diagonal members 3 and 4 diagonally extending between the vertical members 1. Each vertical member 1 has an annular horizontal flange 10 at the upper end. The horizontal flange 10 is connected through a joint member 9 to one end of each horizontal member 2 and each diagonal member 3 and 4. The joint member 9 is detachably engaged with the horizontal flange 10.

19 Claims, 12 Drawing Sheets

SUPPORT SYSTEM

FIELD OF THE INVENTION

The present invention relates to an improved support system suitably applicable as a timbering for construction of a concrete structure.

BACKGROUND OF THE INVENTION

In construction of a concrete structure, a pipe support is traditionally widely used as a timbering, while in recent years, a timbering having a scaffolding structure tends to be used in response to large scaling of a concrete structure.

Such a timbering having a scaffolding structure is called a support structure or a support system, and various support systems have heretofore been proposed.

In the support system disclosed in Japanese Utility Model Publication No. 3-22418, for example, horizontal members and diagonal members are connected to vertical members by utilizing bolts, pins, etc. to ensure a self-supportability of the support system. According to the prior art support system, a timbering having a desired size with a certain strength can be provided by preparing the vertical members, the horizontal members and the diagonal members and suitably connecting these members together.

However, the above prior art support system has the following drawbacks.

In this kind of support system, the diagonal members such as horizontal braces and vertical braces are connected to the vertical members in general. Accordingly, it is necessary to preliminarily define a required number of joint positions on each vertical member for connection of the diagonal members to the vertical members in addition to a required number of joint positions for connection of the horizontal members to the vertical members.

For example, the joint positions for connection of the horizontal members to the vertical members are defined by fixedly providing flange members or the like having a suitable shape at upper and lower ends of each vertical member. Furthermore, the joint positions for connection of the diagonal members to the vertical members are defined by disposing an additional flange member or the like between the upper flange member of the lower vertical member and the lower flange member of the upper vertical member.

Thus, it is necessary to prepare such an additional flange member in connecting the vertical members with each other. As a result, the number of parts for construction of the support system is increased, and the work of disposing the additional flange member between the vertical members to be vertically connected together becomes essential for construction of the support system to remarkably reduce the workability for the support system.

SUMMARY OF THE INVENTION

It is accordingly an object of the present invention to provide a support system suitably applicable as a timbering for construction of a concrete structure, which can reduce the number of parts and greatly improve the workability.

According to the present invention, there is provided a support system comprising a plurality of first jack members arranged horizontally in spaced relationship from each other; a plurality of bottom members vertically extending from said first jack members; a plurality of vertical members vertically extending from said bottom members, said vertical members being connected with each other at upper and lower ends thereof; a plurality of second jack members vertically extending from said vertical members; a plurality of horizontal members horizontally extending between said vertical members; a plurality of diagonal members diagonally extending between said vertical members; a first horizontal flange fixedly provided on an outer circumference of each of said vertical members; and a first joint member detachably engaged with said first horizontal flange to connect said each vertical member to said horizontal members and said diagonal members.

The first horizontal flange is preferably located at the upper end of said each vertical member.

The first horizontal flange may be located in the vicinity of the upper end of said each vertical member.

The first joint member is preferably detachably pinned to said first horizontal flange, and said horizontal members and said diagonal members are preferably detachably pinned to said first joint member.

The support system may further comprise a second horizontal flange fixedly provided on the outer circumference of said each vertical member at an intermediate portion thereof, said second horizontal flange has the same shape as that of said first horizontal flange of said each vertical member; and a second joint member detachably engaged with said second horizontal flange to connect said each vertical member to said horizontal members and said diagonal members.

The second joint member is preferably detachably pinned to said second horizontal flange, and said horizontal members and said diagonal members are preferably detachably pinned to said second joint member.

The support system may further comprise a pair of third horizontal flanges fixedly provided on an outer circumference of each of said bottom members, said third horizontal flanges having the same shape as that of said first horizontal flange; and a pair of third joint members detachably engaged with said third horizontal flanges, respectively, to connect said each bottom member to said horizontal members and said diagonal members.

The third horizontal flanges are preferably located at upper and lower ends of said each bottom member.

The third horizontal flanges may be located in the vicinity of upper and lower ends of said each bottom member.

The third joint members are preferably detachably pinned to said third horizontal flanges, respectively, and said horizontal members and said diagonal members are preferably detachably pinned to said third joint members.

The support system may further comprise a fourth horizontal flange fixedly provided on an outer circumference of each of said first jack members, said fourth horizontal flange having the same shape as that of said first horizontal flange; and a fourth joint member detachably engaged with said fourth horizontal flange to connect said each first jack member to said horizontal members and said diagonal members.

The fourth joint member is preferably detachably pinned to said fourth horizontal flange, and said horizontal members and said diagonal members are preferably detachably pinned to said fourth joint member.

The support system may further comprise a fifth horizontal flange fixedly provided on an outer circumference of each of said second jack members, said fifth horizontal flange having the same shape as that of said first horizontal flange; and a fifth joint member detachably engaged with said fifth horizontal flange to connect said each second jack member to said horizontal members and said diagonal members.

The fifth joint member is preferably detachably pinned to said fifth horizontal flange, and said horizontal members and said diagonal members are preferably detachably pinned to said fifth joint member.

The support system may further comprise a plurality of pressure releasing members connected to upper ends of said second jack members.

The first jack members are placed on the ground or the like, and the lower ends of the bottom members are connected to the upper ends of the first jack members. The bottom members are connected with each other by jointing the horizontal members and the diagonal members (i.e., horizontal braces and vertical braces) through the joint members to the horizontal flanges fixedly provided on the outer circumference of each bottom member at the upper and lower ends thereof. Accordingly, a base construction of the support system can be made strong.

In the case where each first jack member is provided with a horizontal flange similar to that of each bottom member, the first jack member and the bottom member diagonally adjacent thereto can be connected with each other by jointing the diagonal member through the joint member to the horizontal flange. Accordingly, the base construction can be made further strong.

The lower ends of the vertical members are connected to the upper ends of the bottom members, and the lower ends of the vertical members on the upper stage are connected to the upper ends of the vertical members on the lower stage. In this way, the vertical members can be upwardly extended.

The vertical members neighboring to one another on the same stage are connected with each other by jointing the horizontal members and the diagonal members through the joint member to the horizontal flange fixedly provided on the outer circumference of each vertical member. Accordingly, a self-supportability of the support system can be ensured.

Finally, the lower ends of the second jack members to be provided by vertically inverting the first jack members are connected to the upper ends of the vertical members on the uppermost stage, thereby completing the support system. In this condition, a support member such as a sleeper for supporting a lower surface of a floor frame, for example, can be put on the upper ends of the second jack members. Thus, the support system can be utilized as a timbering.

The second jack members may not necessarily be connected to all the vertical members on the uppermost stage, but may be selectively connected to the vertical members on the uppermost stage.

In the case where each second jack member is provided with a horizontal flange similar to that of each vertical member, the second jack members can be connected with each other by jointing the horizontal members and the diagonal members through the joint member to the horizontal flange. Accordingly, rolling of the second jack members can be prevented, and in other words, head rolling of the support system can be prevented.

As described above, according to the present invention, the vertical extension of the vertical members can be effected only by connecting the vertical members with each other at their upper and lower ends. Accordingly, it is unnecessary to mount any flange members or the like in connecting the vertical members as in the prior art, thereby simplifying the work of constructing the support system. In particular, since the joint member is detachably engaged with the horizontal flange of each vertical member, a joint area for the vertical brace to be jointed to the horizontal flange can be ensured to thereby greatly improve the workability for the support system. Further, since the joint members are not necessarily be connected to all the horizontal flanges, the number of parts to be required for construction of the support system can be reduced.

In the case where each first jack member has a horizontal flange, the first jack members neighboring to one another can be integrated by the horizontal members and the horizontal braces. Further, the bottom members neighboring to one another can be also be integrated by the horizontal members and the horizontal braces. Further, the first jack members and the bottom members neighboring thereto can be integrated by the vertical braces, and the bottom members and the vertical members neighboring thereto can be integrated by the vertical braces. Accordingly, a firm base construction of the support system can be realized.

Further, in the case where each vertical member is a relatively long member, an additional horizontal flange is fixedly provided on the outer circumference of each vertical member at an intermediate portion thereof, and the horizontal members and the diagonal members are connected between the intermediate horizontal flanges of the vertical members, thereby ensuring a firm construction of the support system.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described with reference to the drawings.

Figure 1:
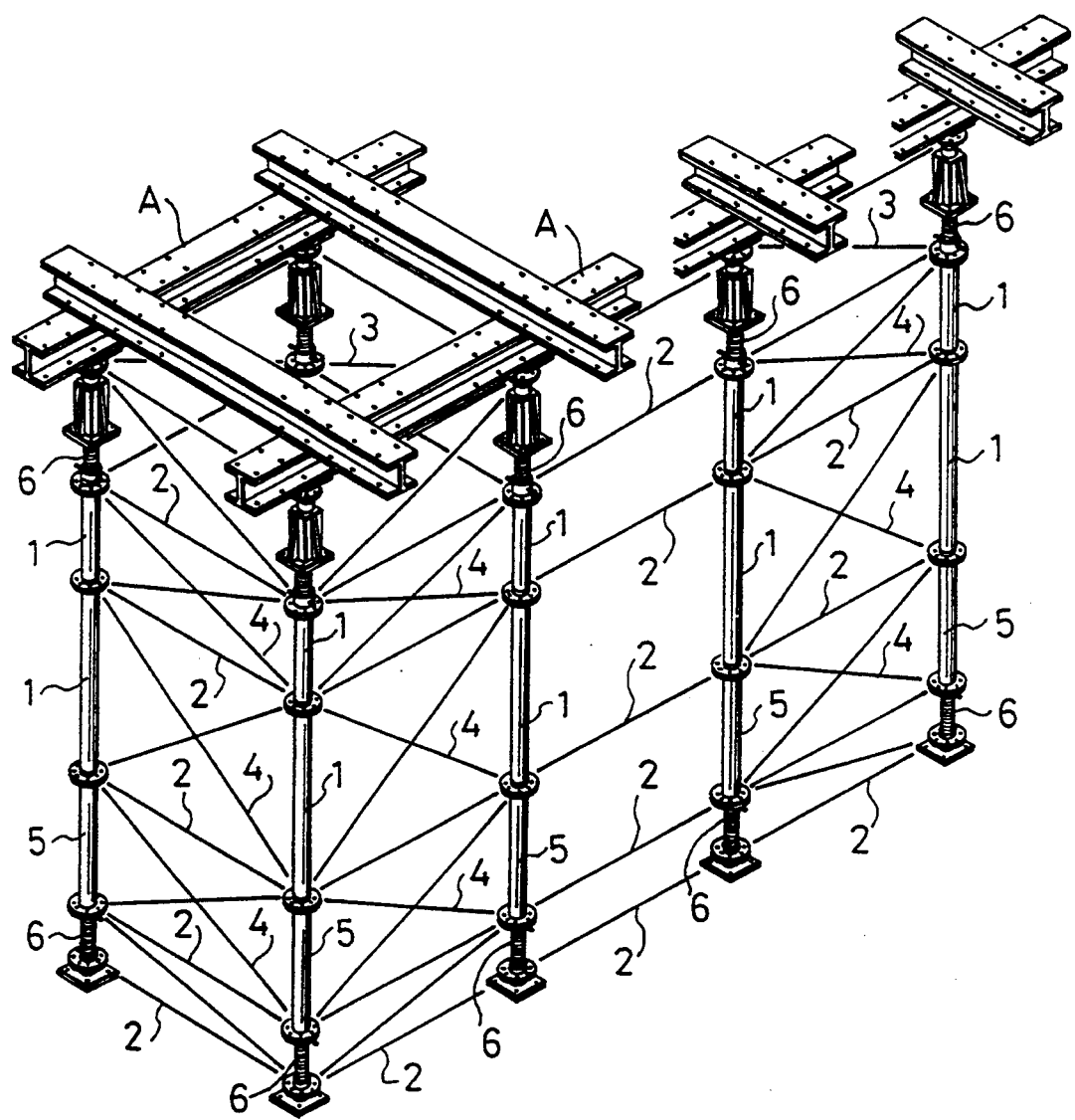
FIG. 1 is a schematic perspective view of a support system according to a preferred embodiment of the present invention.

Referring to FIG. 1, there is shown a support system according to the preferred embodiment of the present invention. The support system includes a plurality of vertical members 1 or columns, a plurality of horizontal or beam members 2, a plurality of diagonal members consisting of horizontal braces 3 and vertical braces 4, a plurality of bottom members 5, and a plurality of jack members 6.

Figure 2:
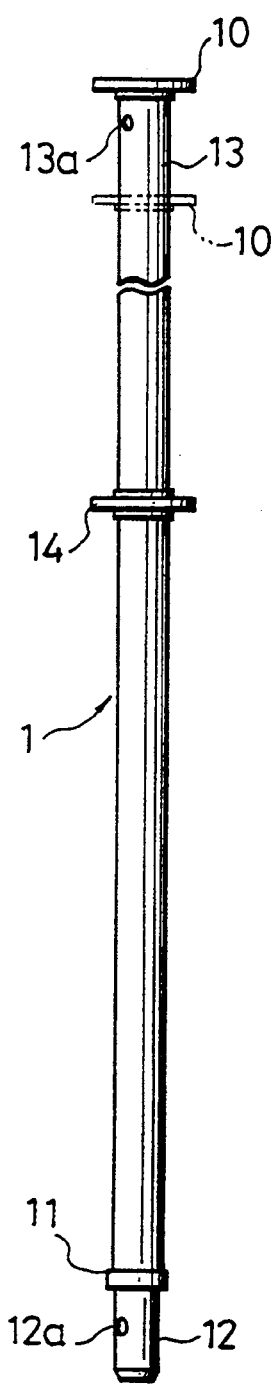
FIG. 2 is an elevational view, partially broken away, of a vertical member shown in FIG. 1.

Each vertical member or column 1 is formed as a pipe member having an outer diameter of about 114 mm in this preferred embodiment. As shown in FIG. 2, a horizontal flange 10 having an annular shape is fixedly provided on an outer circumference of the vertical member or column 1 at an upper end thereof, and a flanged stopper 11 having an annular shape is formed on the outer circumference of the vertical member 1. Further, an intermediate horizontal flange 14 having an annular shape is fixedly provided on the outer circumference of the vertical member 1 at an intermediate portion thereof.

The vertical member 1 has a telescopic joint structure such that other vertical members 1 are adapted to be telescopically jointed to an upper end portion 13 and a lower end portion 12 of the vertical member 1. That is, the lower end portion 12 is formed under the flanged stopper 11, and has an outer diameter smaller than that of the upper end portion 13. Accordingly, the lower end portion 12 of another vertical member I is adapted to be inserted into the upper end portion of the vertical member 1, thus enabling extension of the vertical member 1.

The upper end portion 13 and the lower end portion 12 are formed with a pin insert hole 13a and a pin insert hole 12a, respectively. The pin insert holes 13a and 12a extend through the wall thicknesses of the upper and lower end portions 13 and 12 in the diametrical direction thereof. The pin insert holes 13a and 12a are positioned so that when the lower end portion 12 of another vertical member (upper vertical member) 1 is jointed to the upper end portion 13 of the vertical member (lower vertical member) 1, the pin insert hole 12a of the upper vertical member 1 comes into alignment with the pin insert hole 13a of the lower vertical member 1.

Figure 3:
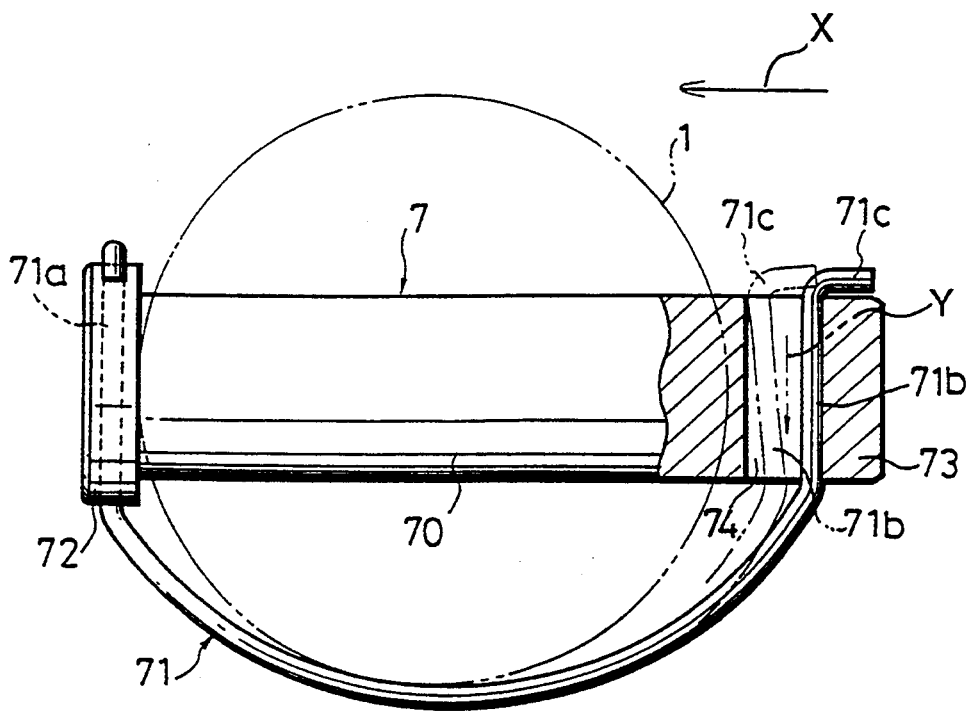
FIG. 3 is a plan view, partially in cross section, of a preferred embodiment of a pin for use in connection of the vertical members.
Figure 4:
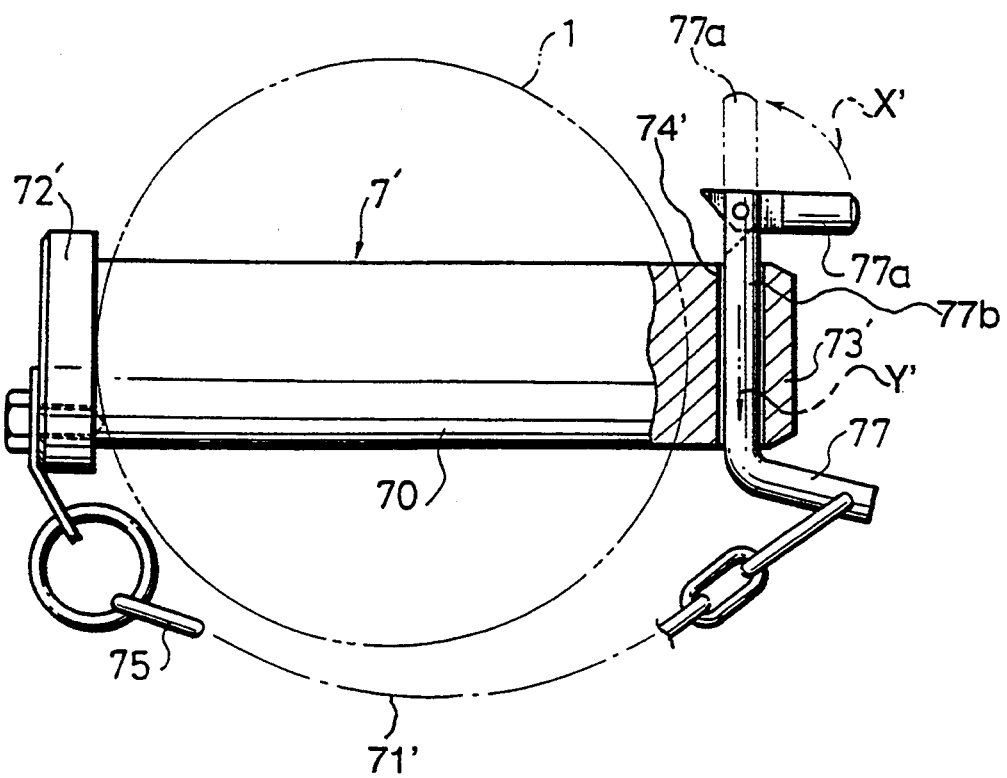
FIG. 4 is a plan view, partially in cross section, of another preferred embodiment of the pin.

A suitable pin is adapted to be removably inserted into the pin insert holes 13a and 12a in the jointed condition of the upper and lower vertical members 1, so as to prevent disengagement between the upper and lower vertical members 1. FIGS. 3 and 4 show some preferred embodiments of such a pin.

Referring to FIG. 3, reference numeral 7 generally designates a pin having a shaft portion 70 and a head portion 72 formed at one end of the shaft portion 70. The shaft portion 70 is adapted to be inserted through the pin insert holes 13a and 12a. The shaft portion 70 is formed at its other end portion 73 with a through hole 74 extending diametrically of the shaft portion 70.

Reference numeral 71 generally designates a stopper formed as a spring member. The stopper 71 is generally arcuately bent so as to extend along the outer circumference of the vertical member 1. The stopper 71 has one end portion 71a retained to the head portion 72 of the pin 7, and has the other end portion 71b inserted through the through hole 74 of the pin 7. The other end portion 71b of the stopper 71 is bent at substantially right angles to form a stop portion 71c extending along the outer circumference of the pin 7 in the axial direction thereof.

The through hole 74 of the pin 7 has a width permitting pass of the stop portion 71c.

In removing the pin 7 from the pin insert holes 13a and 12a, as shown by a phantom line in FIG. 3, the stop portion 71c of the stopper 71 is first pushed by the operator in a direction depicted by an arrow X, and then the other end portion 71b of the stopper 71 is pulled by the operator in a direction depicted by an arrow Y. Thus, the other end portion 71b of the stopper 71 can be removed from the through hole 74, and accordingly the shaft portion 70 of the pin 7 can be removed from the pin insert holes 13a and 12a.

Referring to FIG. 4, reference numeral 7' generally designates another type pin having a shaft portion 70' and a head portion 72'0 formed at one end of the shaft portion 70'. The shaft portion 70' is adapted to be inserted through the pin insert holes 13a and 12a. The shaft portion 70' is formed at its other end portion 73' with a through hole 74' extending diametrically of the shaft portion 70'.

Reference numeral 71' generally designates a stopper consisting of a chain 75 and a pin 77. The chain 75 is pinned at its one end to the head portion 72' of the pin 7', and is connected at the other end to one end portion of the pin 77. An intermediate portion 77b of the pin 77 is inserted through the through hole 74' of the pin 7'. The pin 77 is formed at its other end portion with a stop portion 77a adapted to be pivoted at substantially right angles. In the operative condition of the stopper 71', the stop portion 77a is pivotally bent at substantially right angles with respect to the intermediate portion 77b to extend in the axial direction of the pin 7'.

In removing the pin 7' from the pin insert holes 13a and 12a, as shown by a phantom line in FIG. 4, the stopper portion 77a is first pivoted by the operator in a direction depicted by an arrow X' so as to come into line with the intermediate portion 77b, and then the pin 77 is pulled by the operator in a direction depicted by an arrow Y'. Thus, the pin 77 of the stopper 71' can be removed from the through hole 74', and accordingly the shaft portion 70' of the pin 7' can be removed from the pin insert holes 13a and 12a.

Referring back to FIG. 2, the vertical member 1 has a set length of about twelve feet, and accordingly the horizontal flange 14 having the same planar shape as that of the horizontal flange 10 is provided at the intermediate portion of the vertical member 1. However, in the case where the vertical member 1 has a set length of about six feed or less, the horizontal flange 14 is not necessary, but the horizontal flange 10 only is provided at the upper end of the vertical member 1.

Further, while the horizontal flange 10 is provided at the upper end of the vertical member 1 in this preferred embodiment, it may be fixedly provided on the outer circumference of the upper end portion 13 of the vertical member 1 as shown by a phantom line in FIG. 2.

Figure 5:
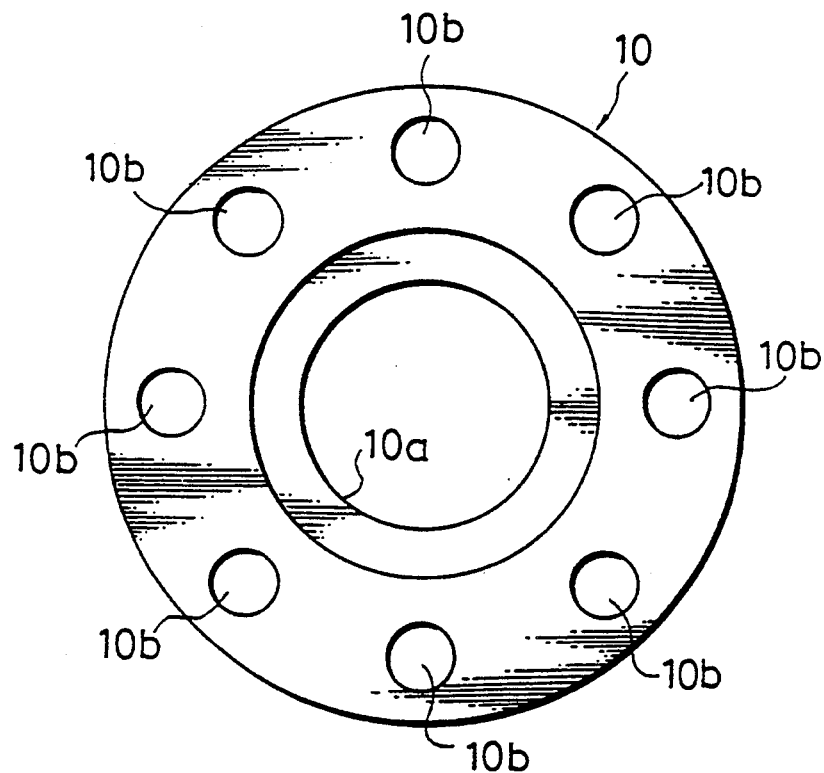
FIG. 5 is a plan view of a horizontal flange to be fixed on an outer circumference of the vertical member at an upper end thereof.
Figure 6:
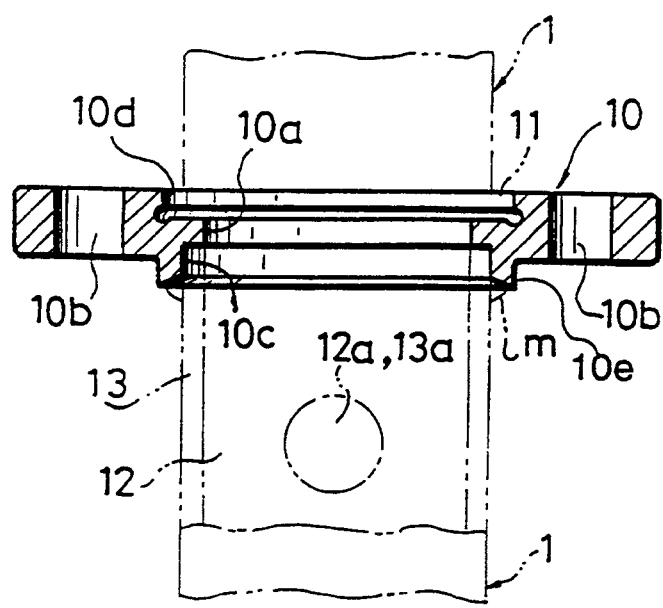
FIG. 6 is a vertical sectional view of the horizontal flange shown in FIG. 5.

Referring to FIGS. 5 and 6, there is shown a structure of the horizontal flange 10. As apparent from FIGS. 5 and 6, the horizontal flange 10 has an axially stepped central hole consisting of an upper hole 10d formed on the upper surface of the horizontal flange 10, a lower hole 10c formed on the lower surface of the horizontal flange 10, and an intermediate hole 10a formed between the upper hole 10d and the lower hole 10c so as to communicate therewith. The intermediate hole 10a is smaller in diameter than the lower hole 10c, and the lower hole 10c is smaller in diameter than the upper hole 10d. The diameter of the intermediate hole 10a is set so that the lower portion 12 of the upper vertical member 1 may fit the intermediate hole 10a, and the diameter of the upper hole 10d is set so that the flanged stopper 11 of the upper vertical member 1 formed just over the lower portion 12 may fit the upper hole 10d. Further, the diameter of the lower hole 10c is set so that the upper end of the upper end portion 13 of the lower vertical member 1 may fit the lower hole 10c.

The horizontal flange 10 is fixed to the upper end of the vertical member 1 in such a manner that an annular projection 10e formed around the lower hole 10c is welded at a portion m to the outer circumference of the upper end portion 13 under the condition where the upper end of the upper end portion 13 is fitted with the lower hole 10c.

The horizontal flange 10 is further formed with a plurality of pin insert holes or flange holes 10b extending through the wall thickness of the flange 10. The pin insert or flange holes 10b are arranged around the central hole in circumferentially equally spaced relationship from each other. In this preferred embodiment, they are arranged at 45 degrees apart from each other. Suitable pins or the like are adapted to be selectively inserted through the pin insert holes 10b.

Figure 7:
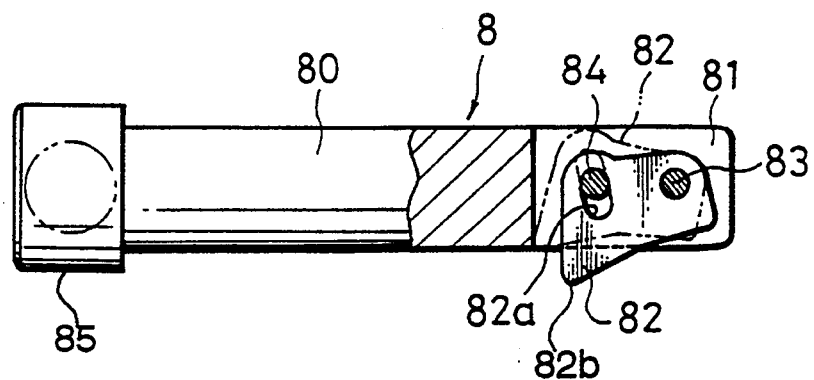
FIG. 7 is a partially cutaway elevational view of a preferred embodiment of a joint pin.

The pin to be removably inserted through the pin insert hole 10b is not especially limitative in structure, but may have the condition that a certain strength is ensured to permanently maintain a joint condition with respect to another member. FIG. 7 shows a preferred embodiment of the joint pin to be inserted through the pin insert hole 10b.

Referring to FIG. 7, reference numeral 8 generally designates a joint pin having a shaft portion 80, a head portion 85 formed at one end of the shaft portion 80, a forked portion 81 formed at the other end of the shaft portion 80 so as to be diametrically split and thereby define an axially elongated space, and a stopper 82 movably retained in this space.

The shaft portion 80 of the joint pin 8 is adapted to be inserted through the pin insert hole 10b, and the forked portion 81 of the joint pin 8 is adapted to project from the pin insert hole 10b.

The stopper 82 is formed as a substantially trapezoidal plate-like member so as to be movably received in the space of the forked portion 81. The stopper 82 is pivotably supported at its one end portion to a first shaft 83 extending across the space of the forked portion 81 near the front end of the pin 8. The stopper 82 is formed at its other end portion with an elongated recess 82a loosely engaging with a second shaft 84 extending across the space of the forked portion 81 distant from the front end of the pin 8 in parallel relationship to the first shaft 83. Accordingly, the stopper 82 can be pivoted about the first shaft 83 with the range of the length of the elongated recess 82a as being guided by the second shaft 84.

In removing the joint pin 8 from the pin insert hole 10b, the stopper 82 is pivoted by the operator about the first shaft 83 from the condition shown by a solid line to the condition shown by a phantom line in FIG. 7. Accordingly, a stop portion 82b of the stopper 82 having facing the lower surface of the horizontal flange 10 is retracted into the space of the forked portion 81. As a result, the shaft portion 80 of the joint pin 8 can be removed from the pin insert hole 10b of the horizontal flange 10.

In inserting the joint pin 8 into the pin insert hole 10b of the horizontal flange 10, the forked portion 81 is allowed to pass through the pin insert hole 10b and project therefrom. At this time, the stopper 82 automatically swings owing to its weight balance about the first shaft 83, thus realizing the operative condition as shown by the solid line in FIG. 7.

Thus, a joint member 9 (see FIG. 11) can be jointed through the joint pin 8 to the horizontal flange 10 of the vertical member 1. Further, the horizontal or beam member 2 and the diagonal member inclusive of the horizontal brace 3 and the vertical brace 4 can be jointed through the joint member 9 to the vertical member 1.

Figure 8:
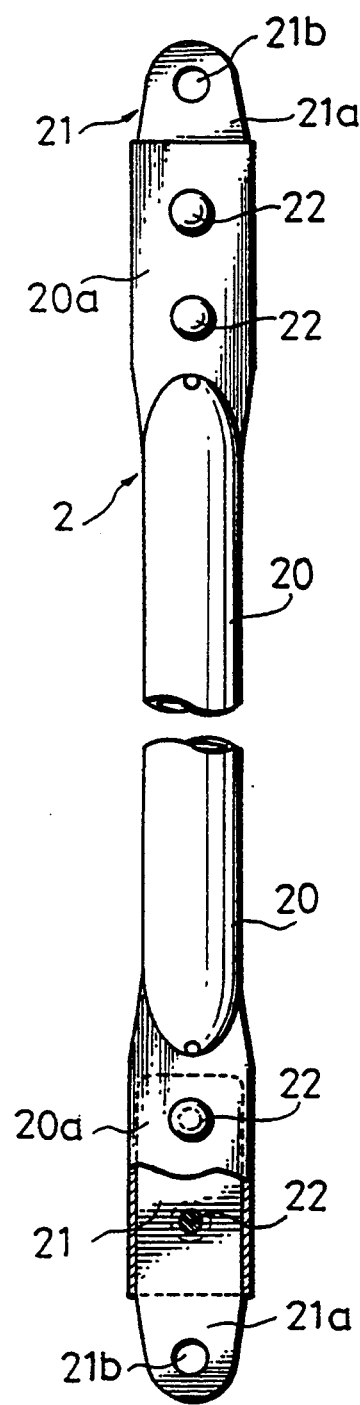
FIG. 8 is an elevational view, partially broken away, of a horizontal member shown in FIG. 1.

Referring to FIG. 8, there is shown a structure of the horizontal member 2. The horizontal member 2 is constituted of a body portion 20 and a pair of joint portions 21 extending from the opposite ends of the body portion 20. The body portion 20 is formed as a pipe member having an outer diameter of about 60 mm in this preferred embodiment. The opposite end portions of the body portion 20 are flattened to form a pair of tab portions 20a each defining an elongated space therein for receiving the corresponding joint portion 21. Each joint portion 21 is formed as an elongated plate-like member having a suitable wall thickness, and it is fixedly held in the corresponding tab portion 20a by means of rivets 22. Further, each joint portion 21 is formed at its projecting end portion 21a with a pin insert hole 21b. The pin insert hole 21b has a diameter permitting insertion of the joint pin 8.

Figure 9:
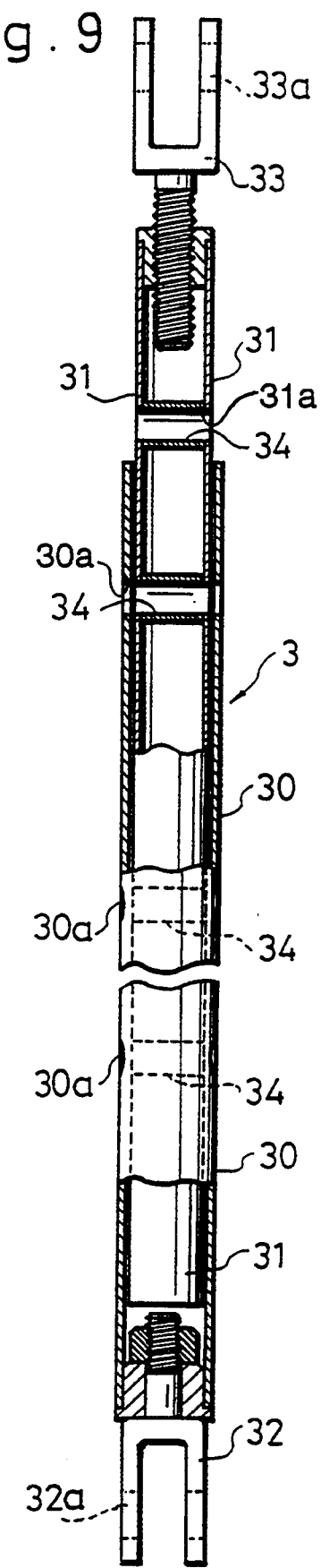
FIG. 9 is an elevational view, partially broken away, of a horizontal brace shown in FIG. 1.

Referring to FIG. 9, there is shown a structure of the horizontal brace 3 as the diagonal member. The horizontal brace 3 is constituted of an outer sleeve 30 having a suitable length, an inner sleeve 31 having a suitable length so as to be telescopically inserted into the outer sleeve 30, a first forked bracket 32 connected to one end of the outer sleeve 30 so as to be rotatable about the axis of the outer sleeve 30, and a second forked bracket 33 connected to one end of the inner sleeve 31 so as to be displaceable in the axial direction of the inner sleeve 31 by means of thread engagement. The first and second forked brackets 32 and 33 are formed with pin insert holes 32a and 33a for receiving the joint pins 8, respectively.

The outer sleeve 30 is formed with a plurality of pin insert holes 30a spaced axially at equal intervals. Each pin insert hole 30a is formed to pass in the diametrical direction of the outer sleeve 30 so as to receive the joint pin 8. Similarly, the inner sleeve 31 is formed with a plurality of pin insert holes 31a spaced axially at equal intervals. Each pin insert hole 31a is formed to pass in the diametrical direction of the inner sleeve 31 so as to receive the joint pin 8. The interval between the adjacent pin insert holes 30a of the outer sleeve 30 is set to be equal to that between the adjacent pin insert holes 31a of the inner sleeve 31.

Further, a cylindrical guide member 34 is mounted in the inner sleeve 31 so as to connect the pin insert holes 31a opposed to each other in the diametrical direction of the inner sleeve 31. The cylindrical guide member 34 serves to effect easy insertion of the joint pin 8.

While the joint pin 8 is adapted to be inserted through the pin insert holes 30a and 31a and the cylindrical guide member 34 in this preferred embodiment, any other suitable pin may be inserted instead of the joint pin 8.

With this construction of the horizontal brace 3, the inner sleeve 31 is axially moved relative to the outer sleeve 30 with a desired depth of insertion so that the pin insert holes 31a and the cylindrical guide members 34 come into alignment with the pin insert holes 30a, and then the joint pin 8 is inserted through any one of the sets of the pin insert holes 30a and 31a aligned with each other through the cylindrical guide member 34. Thus, the length of the horizontal brace 3 can be desirably changed.

The brackets 32 and 33 are adapted to be jointed through the joint pins 8 to the horizontal flanges 10. In the event that the pin insert hole 33a of the bracket 33 is not aligned with the pin insert hole 10b of the horizontal flange 10 in jointing the bracket 33 to the horizontal flange 10, the bracket 33 is rotated relative to the inner sleeve 31 to be moved back or forth in the axial direction of the inner sleeve 31 so that the pin insert hole 33a may come into alignment with the pin insert hole 10b, thus effecting fine adjustment of the positions of the pin insert holes 33a and 10b. While the fine adjustment is carried out by rotating the bracket 33 in this preferred embodiment, it may be carried out by rotating the bracket 32.

Figure 10:
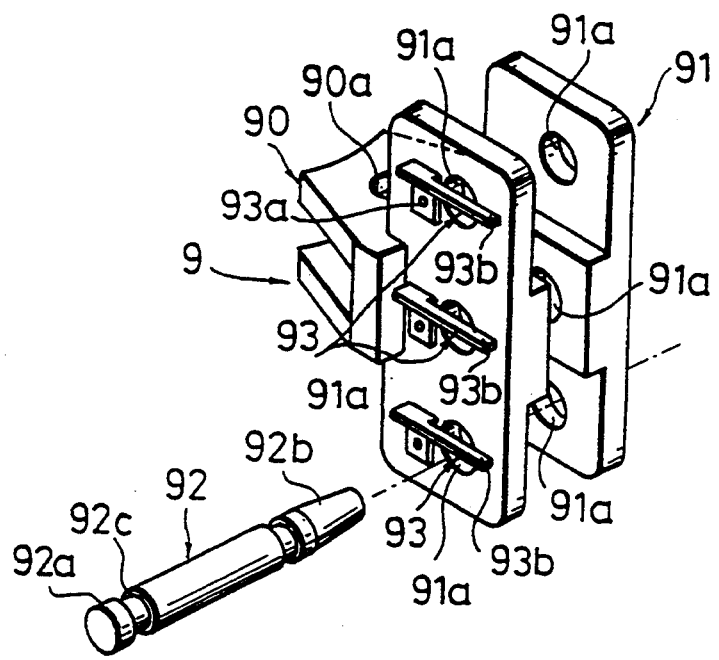
FIG. 10 is a perspective view of a joint member and another preferred embodiment of the joint pin for use therewith.
Figure 11:
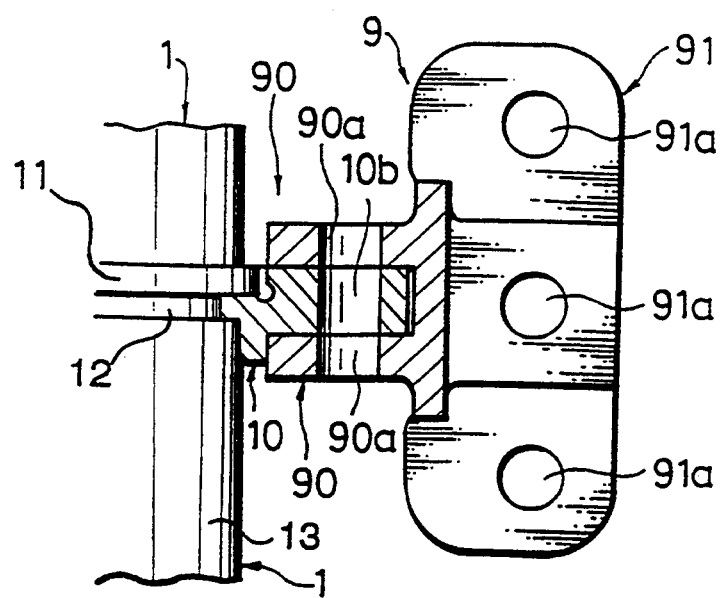
FIG. 11 is a vertical sectional view of the joint member engaged with the horizontal flange of the vertical member.

Referring to FIGS. 10 and 11, there is shown a structure of the joint member 9. The joint member 9 is constituted of a joint portion 90 adapted to be jointed through the joint pin 8 to the horizontal flange 10 and a mounting portion 91 fixedly connected to the joint portion 90 for mounting the horizontal member 2 and the diagonal members such as the horizontal brace 3 and the vertical brace 4.

The joint portion 90 has a forked structure adapted to receive a part of the horizontal flange 10, and the mounting portion 91 also has a forked structure adapted to receive the end portions of the horizontal member 2 and the diagonal members 3 and 4.

The joint portion 90 is formed with a pin insert or joint hole 90a for receiving the joint pin 8. Accordingly, when the joint portion 90 is engaged with the horizontal flange 10, the pin insert hole or joint 90a of the joint portion 90 is aligned with the pin insert hole 10b of the horizontal flange 10. In this condition, the joint pin 8 is inserted through the pin insert holes 90a and 10b to thereby joint the joint portion 90 to the horizontal flange 10.

The mounting portion 91 is formed with a plurality of (e.g., three) pin insert or brace holes 91a each for receiving a joint pin 92 as shown in FIG. 10. The pin insert or brace holes 91a are vertically arranged at suitable intervals so that the horizontal member 2 and the diagonal members 3 and 4 may be jointed through the joint pins 92 to the mounting portion 91.

Thus, the horizontal member 2 and the diagonal members 3 and 4 can be jointed through the joint member 9 to the vertical member 1.

While the joint pins 92 are inserted through the pin insert holes 91a of the joint member 9 in this preferred embodiment, the joint pin 8 may be used instead of the joint pin 92.

The joint pin 92 has a length larger than a distance between outer side surfaces of the mounting portion 91, and has an outer diameter permitting easy insertion through the pin insert hole 91a. The joint pin 92 is formed at its one end portion 92a with a circumferential groove 92c.

The mounting portion 91 is provided with a plurality of stoppers 93 adapted to engage the respective joint pins 92 inserted through the pin insert holes 91a. That is, each stopper 93 is formed as a leaf spring, and it is fixed at its base end 93a to one outer side surface of the mounting portion 91 and a free end portion 93b of the stopper 93 extends so as to overlap the pin insert hole 91a.

In inserting the joint pin 92 through the pin insert hole 91a, the forward end portion 92b of the joint pin 92 is inserted into the pin insert hole 91a overlapped with the stopper 93. Since the forward end portion 92b is slightly tapered, the free end portion 93b of the stopper 93 is gradually urged upwardly by the forward end portion 92b as the insertion proceeds. Thereafter, when the circumferential groove 92c formed at the head portion 92a of the joint pin 92 comes to the stopper 93, the stopper 93 is returned to its normal condition to come into engagement with the circumferential groove 92c, thus preventing escape of the joint pin 92 out of the pin insert hole 91a.

In removing the joint pin 92 from the pin insert hole 91a, the free end portion 93b of the stopper 93 is lifted by the operator to be disengaged from the circumferential groove 92c of the joint pin 92. In this condition, the joint pin 92 is pulled out of the pin insert hole 91a by the operator.

Figure 12:
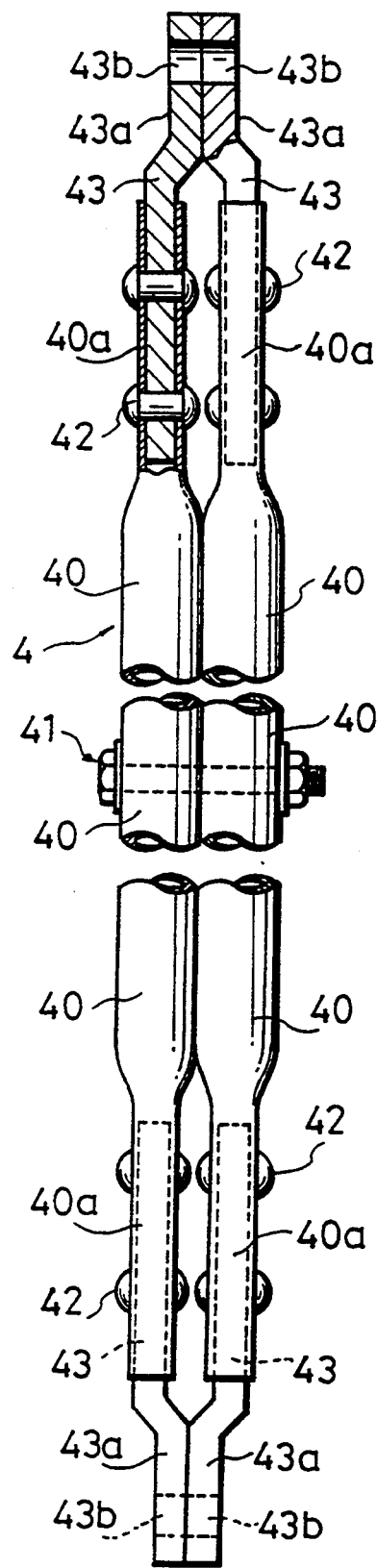
FIG. 12 is a plan view, partially broken away, of a vertical brace shown in FIG. 1.

Referring to FIG. 12, there is shown a structure of the vertical brace 4 as the diagonal member. The vertical brace 4 is generally constructed of two body portions 40 formed as pipe members having the same diameter. The two body portions 40 are pivotably jointed together at their central portions 41 by means of a bolt and a nut. Thus, the two body portions 40 can be pivoted about the bolt to form an X-shaped configuration.

Each body portion 40 is flattened at its opposite end portions 40a each defining therein an elongated space for receiving a bracket 43. The bracket 43 is fixedly held in this elongated space of each flattened end portion 40a by means of rivets 42. A joint portion 43a of the bracket 43 projecting from the flattened end portion 40a is adapted to be inserted into the forked mounting portion 91 of the joint member 9.

The joint portion 43a of the bracket 43 is formed with a pin insert hole 43b having a diameter permitting insertion of the joint pin 92.

Figure 13:
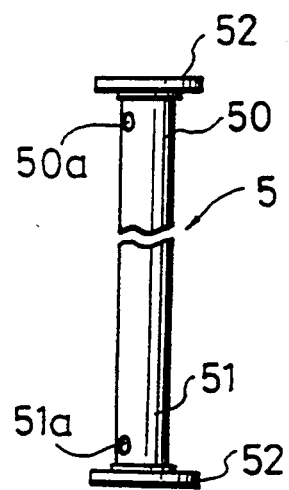
FIG. 13 is an elevational view, partially broken away, of a bottom member shown in FIG. 1.

Referring to FIG. 13, there is shown a structure of the bottom member 5. The bottom member 5 is formed as a pipe member having the same diameter as that of the vertical member 1. The lower end portion 12 of the vertical member 1 is adapted to be jointed to an upper end portion 50 of the bottom member 5, and a lower end portion 51 of the bottom member 5 is jointed to the jack member 6. The upper and lower end portions 50 and 51 of the bottom member 5 have a structure similar to that of the upper end portion 13 of the vertical member 1.

A pair of upper and lower horizontal flanges 52 having the same shape as that of the horizontal flange 10 of the vertical member 1 are fixedly provided at the upper and lower ends of the bottom member 5.

The upper and lower end portions 50 and 51 of the bottom member 5 are respectively formed with upper and lower pin insert holes 50a and 51a similar to the pin insert hole 13a of the upper end portion 13 of the vertical member 1. The upper pin insert hole 50a is adapted to be aligned with the pin insert hole 13a of the vertical member 1, and the lower pin insert hole 51a is adapted to be aligned with a pin insert hole (not shown) of the jack member 6.

The length of the bottom member 5 is not especially limitative, but it is preferably set to about 1200 mm. Further, while the horizontal flanges 52 are provided at the upper and lower ends of the bottom member 5 in this preferred embodiment, they may be provided on the outer circumferences of the upper and lower end portions 50 and 51.

Figure 14:
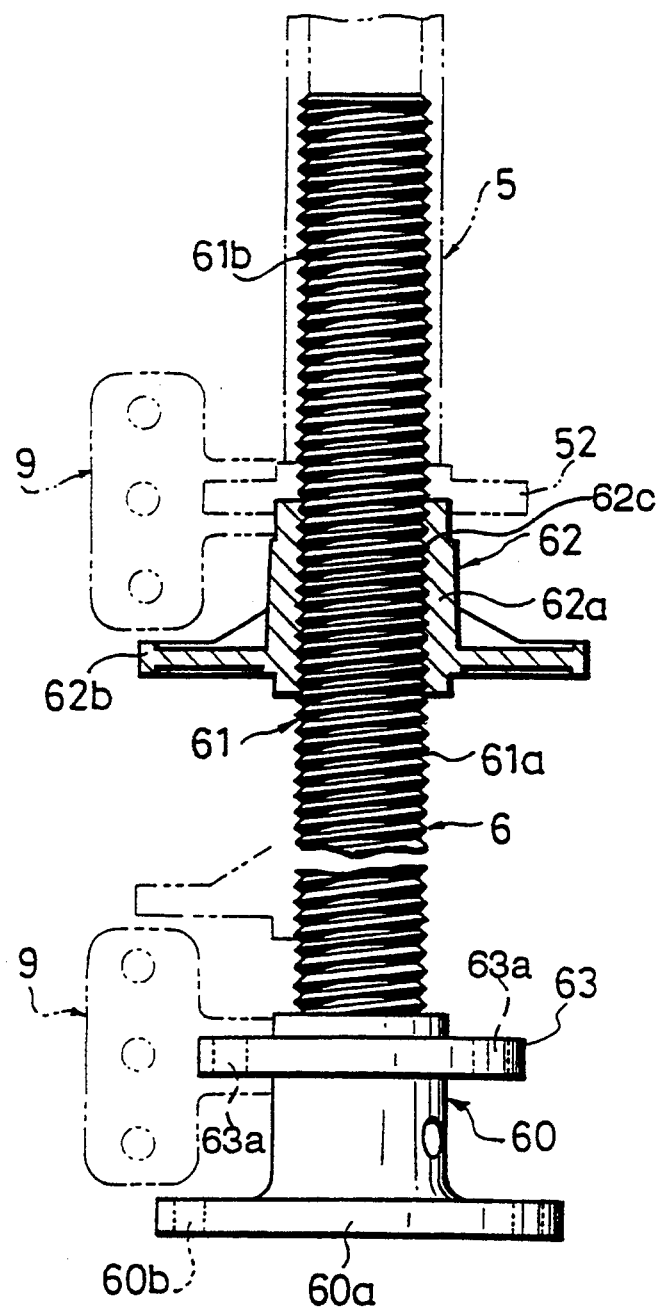
FIG. 14 is an elevational view, partially in cross section, of a jack member shown in FIG. 1.

Referring to FIG. 14, there is shown a structure of the jack member 6. The jack member 6 in this preferred embodiment is of a screw jack type including a base portion 60 adapted to be placed on the ground or the like, a threaded shaft portion 61 extending upwardly from the base portion 60, and an operation handle 62 threadedly engaged with the threaded shaft portion 61.

The base portion 60 is formed at its lower end with a base plate 60a adapted to be stably placed on the ground or the like. Further, the base portion 60 is formed at its upper end portion with a horizontal flange 63 having the same shape as that of the horizontal flange 10 of the vertical member 1. The horizontal flange 63 is formed with a plurality of pin insert holes 63a each for receiving the joint pin 8, so that the joint member 9 is adapted to be jointed through the joint pin 8 to the horizontal flange 63.

The base portion 60a is formed with a plurality of anchor insert holes 60b each for receiving a suitable anchor to be fixed to the ground or the like.

The threaded shaft portion 61 is fixed at its lower end to the base portion 60, and has an external thread 61a over the length. The outer diameter of the threaded shaft portion 61 is set so that an upper end portion 61b of the threaded shaft portion 61 may be inserted into the lower end portion 51 of the bottom member 5.

The operation handle 62 includes a guide portion 62a having an internal thread 62c engaged with the external thread 61a of the threaded shaft portion 61 and a handle portion 62b extending horizontally outwardly from the guide portion 62a. The guide portion 62a has an upper end adapted to stop the lower end of the bottom member 5. The handle portion 62b is adapted to be rotated to allow vertical movement of the operation handle 62 in the axial direction of the threaded shaft portion 61.

Accordingly, when the lower end portion 51 of the bottom member 5 is loosely engaged with the upper end portion 61b of the threaded shaft portion 61, and the lower horizontal flange 52 of the bottom member 5 is fittedly stopped by the upper end of the operation handle 62. When the operation handle 62 is rotated from this condition, the bottom member 5 is lifted by the operation handle 62 to thereby change the height of the bottom member 5 with reference to the ground or the like, and accordingly change the height of the vertical member 1 to be jointed to the upper end of the bottom member 5 with reference to the ground or the like. Accordingly, the reference height of the vertical member 1 can be adjusted to be equal to that of the neighboring vertical members 1.

Owing to the horizontal flange 63 of the jack member 6, the horizontal members 2 can be jointed between the jack member 6 and the neighboring jack members 6; the horizontal braces 3 can be jointed through the joint members 9 between the jack member 6 and the neighboring jack members 6; and the vertical braces 4 can be jointed between the jack member 6 and the neighboring bottom members 5.

Further, the horizontal flange 14 of the vertical member 1 and the horizontal flange 63 of the jack member 6 have the same shape as that of the horizontal flange 10, and so the detailed explanation thereof will be omitted herein.

As shown in FIG. 1, the jack member 6 is further mounted on the upper end of the uppermost vertical member 1 under the vertically inverted condition, so as to support a lower surface of a support member A such as a sleeper through a pressure release member B utilizing a hydraulic pressure or the like.

Figure 15:
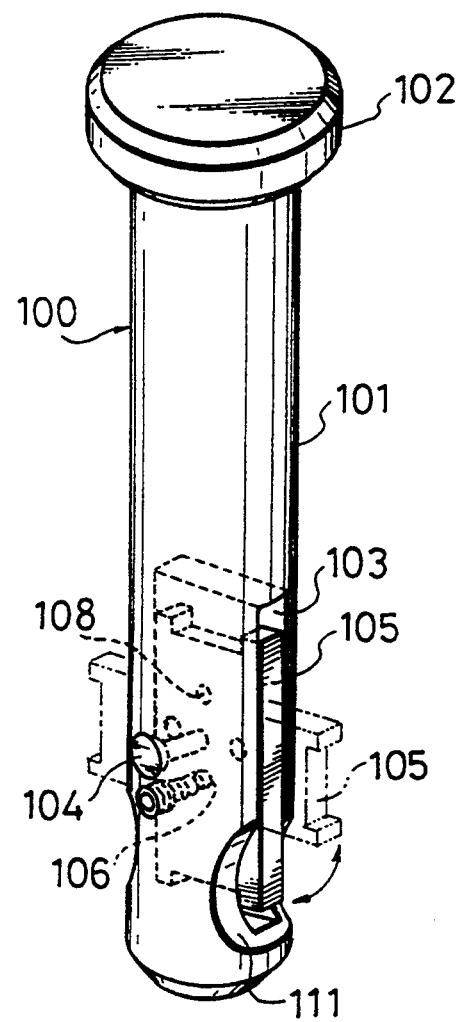
FIG. 15 is a perspective view of another preferred embodiment of the joint pin.
Figure 16:
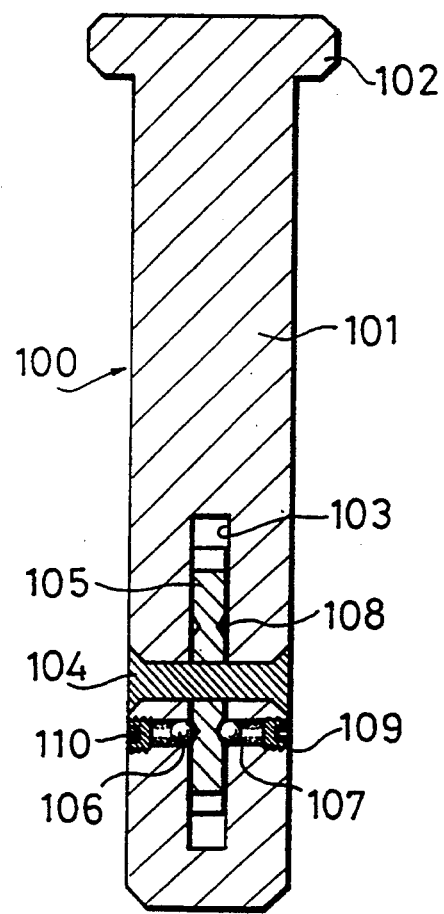
FIG. 16 is a vertical sectional view of the joint pin shown in FIG. 15.

Referring to FIGS. 15 and 16, there is shown a structure of another preferred embodiment of the joint pin to be used instead of the joint pins 8 and 92. Reference numeral 100 generally designates a joint pin including a round shaft portion 101 having an elongated space 103, a flanged head portion 102 formed at one end of the shaft portion 101, and a substantially rectangular platelike stopper 105 rotatably received in the elongated space 103.

The elongated space 103 is defined in the other end portion of the shaft portion 101 so as to extend across the diameter of the shaft portion 101 and be elongated in the axial direction of the shaft portion 101. The rectangular stopper 105 is rotatably supported at its central portion by a shaft 104 extending across the diameter of the shaft portion 101 and the thickness of the stopper 105.

A plurality of recesses 108 are formed on both side surfaces of the stopper 105 around the shaft 104 so as to be circumferentially spaced from each other a suitable distance.

A pair of opposed holes 109 are formed through the shaft portion 101 in the diametrical direction thereof so as to extend in parallel to the shaft 104 and communicate with the elongated space 103.

There are received in each hole 109 a ball 106 adapted to engage one of the recesses 108, a spring 107 for normally biasing the ball 106 toward the stopper 105, and a plug 110 for retaining the spring 107.

A pair of semicircular cutouts 111 are formed at diametrically opposite positions of the shaft portion 101 so as to overlap a lower end portion of the elongated space 103.

With this construction, when the stopper 105 is in a rotative condition where it is fully stored in the elongated space 103 as shown by a solid line in FIG. 15, the stopper 105 is locked in position by the engagement of the balls 106 with the opposite recesses 108. In this condition, the joint pin 100 is inserted through the pin insert holes 90a and 10b as shown in FIG. 11, and then the stopper 105 is rotated at right angles to project from the elongated space 103 as shown by a phantom line in FIG. 15. In this condition, the stopper 105 is locked in position by the engagement of the balls 106 with the opposite recesses 108, and abuts against the outer surface of the joint portion 90, thus preventing escape of the joint pin 100 out of the pin insert holes 90a and 10b. In rotating the stopper 105 from the fully stored condition to the projected condition, the cutouts 111 formed on the shaft portion 101 so as to overlap the elongated space 103 enables the operator to easily rotate and project the stopper 105 from the elongated space 103.

The support system according to the preferred embodiment is constructed and operated as follows:

First, a required number of jack members 6 are arranged in order on the ground or the like.

The jack members 6 neighboring to one another are connected together by jointing the horizontal members 2 and the horizontal braces 3 through the joint members 9 to the horizontal flanges 63 of the jack members 6, thereby preventing falling and movement of the jack members 6 to prevent deformation of the set of the jack members 6 connected together.

Then, the bottom member is jointed to each jack member 6 by engaging the lower end portion 51 of the bottom member 5 with the upper end portion 61b of the threaded shaft portion 61 of the jack member 6.

Further, the bottom members 5 neighboring to one another are connected together by jointing the horizontal members 2 and the diagonal members 3 and 4 through the joint members 9 to the upper and lower horizontal flanges 52 of the bottom members 5, thereby preventing deformation of the set of the bottom members 5 connected together.

Further, in the case of connecting the bottom members 5 through the vertical braces 4 to the jack members 6, a base construction of the support system can be made further strong.

Then, the lower end portion 12 of the vertical member 1 is inserted into the upper end portion 50 of each bottom member 5, and then are jointed together through the joint pin 7 for example, thus standing the vertical member 1 over the bottom member 5 in line therewith. In succession, the lower end portion 12 of the next upper vertical member 1 is inserted into the upper end portion 13 of each lower vertical member 1, and they are jointed together through the joint pin 7 for example, thus standing the upper vertical member 1 over the lower vertical member 1 in line therewith. In this manner, the subsequent vertical members 1 are similarly stood over the previous vertical members 1 in line therewith. In this stage, the vertical members 1 neighboring to one another are connected together by jointing the horizontal members 2 and the diagonal members 3 and 4 through the joint members 9 to the horizontal flanges 10 (and the horizontal flanges 14 if provided).

Further, the lowermost vertical members 1 and the bottom members 5 are connected together by jointing the vertical braces 4 through the joint members 9 to the horizontal flanges 10 and the horizontal flanges 52, thereby ensuring a self-supportability of the support system.

Finally, the upper end portion 61b of the threaded shaft portion 61 of the jack member 6 vertically inverted is inserted into the upper end portion 13 of each uppermost vertical member 1, and they are jointed together through the joint pin 7 for example, thus standing the vertically inverted jack member 6 over the uppermost vertical member 1 in line therewith.

In this stage, the vertically inverted jack members 6 neighboring to one another are connected together by jointing the horizontal members 2 and the horizontal braces 3 through the joint members 9 to the horizontal flanges 63, thereby preventing rolling of the vertically inverted jack members 6.

Further, in the case of connecting the vertically inverted jack members 6 through the vertical braces 4 to the uppermost vertical members 1, the set of the vertically inverted jack members 6 can be stably arranged at the upper end of the support system.

In this manner, the construction of the support system is completed. In this condition, the support A such as a sleeper for supporting a lower surface of a floor frame (not shown) is allowed to be put on the base plates 60a of the vertically inverted jack members 60.

While the vertically inverted jack members 6 are jointed to all the uppermost vertical members 1 in this preferred embodiment, the joint of the vertically inverted jack members 6 to all the uppermost vertical members 1 is not necessary, but is arbitrary.

Further, the joint members 9 are not necessarily jointed to all of the horizontal flanges 10, 14 and 63. That is, the joint members 9 may be selectively used as required.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A support system comprising:
   a plurality of columns grouped into a plurality of sets, each of said plurality of columns having a first end and a second end, a plurality of said columns in each set having said first end connected to a second end of an adjacent column in said set, said sets of columns extending in an axial direction of said plurality of columns;
   a plurality of flanges respectively connected to said first end of each of said plurality of said columns in each set, each of said plurality of flanges defining a plurality of flange holes positioned circumferentially around said each flange;
   a plurality of joint members connected to said plurality of flanges, each of said plurality of joint members including a joint portion and a mounting portion integrally connected to each other, said joint portion defining a joint hole positionable substantially in line with one of said plurality of flange holes, said mounting portion defining a plurality of brace holes;
   a plurality of beam members having a first end connected to one of said plurality of joint members and a second end connected to another of said plurality of joint members, said first and second end of said plurality of beam members each defining a beam hole positionable substantially in line with one of said plurality of brace holes;
   a plurality of diagonal members having a first end connected to one of said plurality of joint members and a second end connected to another of said plurality of joint members, said first and second end of said plurality of diagonal members each defining a diagonal member hole positionable substantially in line with another one of said plurality of brace holes.

2. A support system in accordance with claim 1, further comprising:
a plurality of pins insertable into said flange holes and said joint holes, and connecting one of said plurality of flanges to one of said plurality of joint members;
another plurality of pins insertable into said brace holes, said beam holes and said diagonal member holes, and detachably connecting one of said plurality of said beam members and one of said plurality of diagonal members to one of said plurality of joint members.

3. A support system in accordance with claim 1, further comprising:
another flange mounted on one of said plurality of columns, said another flange being similar to one of said plurality of flanges.

4. A support system in accordance with claim 1, further comprising:
a bottom member connected to one end of said sets of columns, said bottom member including a flange;
a jack connected to one end of said bottom member substantially opposite said sets of columns, said jack including a flange.

5. A support system in accordance with claim 1, wherein:
said joint portion of said plurality of said joint members includes a bifurcated structure positionable around one of said plurality of flanges and for receiving said one of said plurality of flanges.

6. A support system in accordance with claim 1, wherein:
said mounting portion of said plurality of said joint members includes a bifurcated structure positionable around one of said first and second ends of said plurality of beam members and said plurality of diagonal members, and for receiving said ends.

7. A support system in accordance with claim 5, wherein:
said bifurcated structure of said joint portion of said plurality of joint members defines said joint hole.

8. A support system in accordance with claim 6, wherein:
said bifurcated structure of said mounting portion of said plurality of joint members defines said plurality of brace holes.

9. A support system in accordance with claim 1, wherein:
one of said plurality of said beam members connects to a centrally positioned brace hole of one said mounting portion;
one of said plurality of said diagonal members connects to one of said brace holes positioned on an axial side of said centrally positioned brace hole;
another of said plurality of said diagonal members connects to one of said brace holes positioned on another axial side of said centrally positioned brace hole.

10. A support system in accordance with claim 9, wherein:
said mounting portion of one of said plurality of joint members defines a first brace hole, a second brace hole, and a third brace hole;
said one of said beam members extends substantially radially from said one of said plurality of columns;
said one of said diagonal members extends at an angle between an axial side of one of said plurality of beam members and said one of said plurality of columns;
said another of said diagonal members extends at an angle between another axial side of said one of said plurality of beam members and said one of said plurality of columns.

11. A support system in accordance with claim 1, wherein:
said plurality of flange holes and said joint hole extend in said axial direction of said plurality of columns;
said plurality of brace holes extend in a substantially circumferential direction of said plurality of columns.

12. A support system in accordance with claim 1, wherein:
said plurality of flange holes and said joint hole extend in said axial direction of said plurality of columns;
said plurality of brace holes extend in a direction substantially perpendicular to said axial direction of said plurality of columns.

13. A joint system comprising:
a column having an axial direction;
a flange connected to said column, said flange defining a plurality of flange holes positioned circumferentially around said flange;
a joint member connected to said flange and including a joint portion and a mounting portion integrally connected to each other, said joint portion defining a joint hole positionable substantially in line with one of said plurality of flange holes, said mounting portion defining a plurality of brace holes.

14. A joint system in accordance with claim 13, wherein:
said joint portion of said joint member includes a bifurcated structure positionable around said flange and for receiving said flange.

15. A joint system in accordance with claim 13, wherein:
said mounting portion of said of said joint member includes a bifurcated structure positionable around one of first and second ends of a beam member and a diagonal member, and for receiving said ends.

16. A joint system in accordance with claim 14, wherein:
said bifurcated structure of said joint portion defines said joint hole.

17. A joint system in accordance with claim 15, wherein:
said bifurcated structure of said mounting portion defines said plurality of brace holes.

18. A joint system in accordance with claim 13, wherein:
said plurality of flange holes and said joint hole extend in said axial direction of said column;
said plurality of brace holes extend in a substantially circumferential direction of said column.

19. A joint system in accordance with claim 13, wherein:
said plurality of flange holes and said joint hole extend in said axial direction of said column;
said plurality of brace holes extend in a direction substantially perpendicular to said axial direction of said column;
said plurality of brace holes are positioned adjacent each other in said axial direction of said column.

* * * * *